United States Patent
Ye et al.

(10) Patent No.: US 10,164,544 B2
(45) Date of Patent: Dec. 25, 2018

(54) ISOLATED PARTIAL POWER CONVERTER

(71) Applicant: Futurewei Technologies, Inc., Plano, TX (US)

(72) Inventors: Liming Ye, Frisco, TX (US); Heping Dai, Plano, TX (US); Dianbo Fu, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/635,705

(22) Filed: Jun. 28, 2017

(65) Prior Publication Data
US 2018/0183347 A1  Jun. 28, 2018

Related U.S. Application Data

(60) Provisional application No. 62/437,718, filed on Dec. 22, 2016.

(51) Int. Cl.
*H02M 1/08* (2006.01)
*H02M 3/335* (2006.01)
*H02M 1/00* (2006.01)

(52) U.S. Cl.
CPC ......... *H02M 3/33592* (2013.01); *H02M 1/08* (2013.01); *H02M 2001/0074* (2013.01); *H02M 2001/0093* (2013.01)

(58) Field of Classification Search
CPC ........ H02M 1/08; H02M 1/088; H02M 1/096; H02M 3/335; H02M 3/33507; H02M 3/33592; H02M 2001/0074; H02M 2001/0093
See application file for complete search history.

(56) References Cited

U.S. PATENT DOCUMENTS

| | | | |
|---|---|---|---|
| 6,215,683 B1 * | 4/2001 | Mao | H02M 1/10 363/142 |
| 9,614,453 B2 * | 4/2017 | Dai | H02M 3/337 |
| 2009/0206804 A1 * | 8/2009 | Xu | H02M 3/1584 323/234 |
| 2012/0014152 A1 * | 1/2012 | Nakamura | H02M 1/4258 363/126 |
| 2016/0294294 A1 * | 10/2016 | Ye | H02M 3/33592 |

OTHER PUBLICATIONS

Inti, V V Vijetha, et al., "A New Topology for Power Factor Correction using Resonant Converters", *International Journal of Soft Computing and Engineering (IJSCE)*, vol. 3. Issue 4, (Sep. 2013), 120-123.

McLyman, William T., "Chapter 13—Flyback Converter, Transformer Design", *In: Transformer and Induction Design Handbook*, Third Edition, © (2004) Marcel Dekker, Inc., (2004) 45 pgs.

* cited by examiner

*Primary Examiner* — Matthew Nguyen
(74) *Attorney, Agent, or Firm* — Schwegman Lundberg & Woessner, P.A.

(57) ABSTRACT

An Input-Series-Output-Parallel (ISOP)-type partial power converter circuit comprises: an isolated, unregulated DC-to-DC converter configured to generate a first output voltage at a first output voltage node; and a regulated DC-to-DC converter coupled with the unregulated DC-to-DC converter and configured to generate a second output voltage at a second output voltage node, the regulated DC-to-DC converter comprising a resonant forward-flyback converter configuration; wherein the first output voltage node is coupled in parallel with the second output voltage node.

20 Claims, 12 Drawing Sheets

ISOLATED PARTIAL POWER CONVERTER

CLAIM OF PRIORITY

This application claims the benefit of priority under 35 U.S.C. § 119(e) to U.S. Provisional Patent Application Ser. No. 62/437,718, filed on Dec. 22, 2016, which is hereby incorporated by reference herein in its entirety.

FIELD OF THE INVENTION

The present disclosure is related to power supplies, and in particular to power converters in power supplies.

BACKGROUND

Power converters have been used in power supplies for voltage and power conversions. High efficiency power converters are needed in many applications to reduce the power losses and the heat generated, shrink the size and cut the cost of the power supplies and the cooling equipment. Power converters with wider voltage regulation range generally have lower power efficiencies compared to converters with narrower voltage regulation range and unregulated converters, and vice versa, given that other aspects and conditions of the converters are comparable. Voltage regulation capability and power conversion efficiency are often two conflicting things for high efficiency power conversions.

A forward converter is a direct current (DC)-to-DC converter that uses a transformer to provide an output voltage different from the input voltage. The ratio of the output voltage to the input voltage depends on the ratio of windings around a core (typically a ferro-magnetic core). A flyback converter makes use of a diode or transistor on the output side of the transformer to prevent power from being drawn from the converter while current is flowing on the input side. A capacitor is also placed in parallel with the load, maintaining a supply voltage while current on the output side is blocked by the diode. When power is disconnected from the primary side, current flows through the diode, recharging the capacitor.

Resonant converters include a tank circuit (comprising at least one inductor and at least one capacitor) that actively participates in determining input-to-output power flow. Operation at the resonant frequency reduces impedance, increasing power conversion efficiency.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, an Input-Series-Output-Parallel (ISOP)-type partial power converter circuit is provided that comprises: an isolated, unregulated DC-to-DC converter configured to generate a first output voltage at a first output voltage node; and a regulated DC-to-DC converter coupled with the unregulated DC-to-DC converter and configured to generate a second output voltage at a second output voltage node, the regulated DC-to-DC converter comprising a resonant forward-flyback converter configuration; wherein the first output voltage node is coupled in parallel with the second output voltage node.

Optionally, in any of the preceding aspects, the unregulated, isolated DC-to-DC converter comprises a resonant converter operating around a resonant frequency and 0.5 duty cycle.

Optionally, in any of the preceding aspects, the regulated DC-to-DC converter comprises a half-bridge converter.

Optionally, in any of the preceding aspects, the half-bridge converter is coupled in series with a clamping capacitor.

Optionally, in any of the preceding aspects, the regulated DC-to-DC converter comprises a transformer having a primary winding and a secondary winding, the regulated DC-to-DC converter further comprising an inductor coupled to the secondary winding and a full-bridge rectifier coupled to the secondary winding through the inductor and a resonance capacitor.

Optionally, in any of the preceding aspects, the unregulated DC-to-DC converter is referenced to ground by coupling an input to the unregulated DC-to-DC converter to a circuit ground node.

Optionally, in any of the preceding aspects, the regulated DC-to-DC converter further comprises a half-bridge converter coupled to a primary winding of a transformer and to a second input of the unregulated DC-to-DC converter.

Optionally, in any of the preceding aspects, the unregulated DC-to-DC converter is referenced to ground by coupling a first input to the unregulated DC-to-DC converter to a circuit ground node, the regulated DC-to-DC converter further comprising: a transformer having a primary winding and a secondary winding, the secondary winding coupled to both a positive output node of the regulated DC-to-DC converter and a flyback output node of the regulated DC-to-DC converter.

According to one aspect of the present disclosure, a partial power converter system is provided that comprises: an isolated, unregulated DC-to-DC converter configured to generate a first output voltage at a first output voltage node; and a regulated DC-to-DC converter coupled with the unregulated DC-to-DC converter and a power supply node, the regulated DC-to-DC converter being configured to generate a second output voltage at a second output voltage node, the regulated DC-to-DC converter comprising a resonant forward-flyback converter configuration; wherein the first output voltage node is coupled to a load in parallel with a flyback node of the regulated DC-to-DC converter.

Optionally, in any of the preceding aspects, the regulated DC-to-DC converter comprises a half-bridge converter coupled in series with a clamping capacitor.

Optionally, in any of the preceding aspects, the regulated DC-to-DC converter comprises: a transformer having primary and secondary windings; and a half-bridge converter coupled between the second output voltage node and a ground, the secondary windings of the transformer being coupled to a midpoint of the half-bridge converter.

Optionally, in any of the preceding aspects, the regulated DC-to-DC converter further comprises: a first capacitor coupled to the second output voltage node and the secondary windings of the transformer; and a second capacitor coupled to the secondary windings of the transformer and a ground.

Optionally, in any of the preceding aspects, the unregulated DC-to-DC converter is referenced to ground by coupling an input to the unregulated DC-to-DC converter to a circuit ground node.

According to one aspect of the present disclosure, a method for operation of an Input-Series-Output-Parallel (ISOP)-type power converter circuit is provided, the method comprising: generating a DC power supply voltage; generating an unregulated DC voltage from the power supply voltage with an isolated, unregulated DC-to-DC converter; generating a regulated DC voltage from the power supply voltage with a regulated DC-to-DC converter coupled in parallel with the unregulated DC-to-DC converter and having a resonant forward-flyback converter configuration; and coupling the unregulated DC voltage to the regulated DC voltage.

Optionally, in any of the preceding aspects, generating the unregulated DC voltage and the regulated DC voltage comprises applying the DC power supply voltage across an input capacitor, a clamping capacitor, and a series pair of transistors.

Optionally, in any of the preceding aspects, generating the regulated DC voltage comprises: transmitting an AC voltage over a transformer wherein a secondary AC voltage is 180° out of phase with a primary AC voltage; and converting the secondary AC voltage to the regulated DC voltage.

Optionally, in any of the preceding aspects, generating the unregulated DC voltage comprises using a resonant converter operating around a resonant frequency and 0.5 duty cycle.

Optionally, in any of the preceding aspects, the regulated DC-to-DC converter comprises a half-bridge converter.

Optionally, in any of the preceding aspects, the half-bridge converter is coupled in series with a clamping capacitor.

Optionally, in any of the preceding aspects, the regulated DC-to-DC converter comprises a transformer having a primary winding and a secondary winding, the regulated DC-to-DC converter further comprising an inductor coupled to the secondary winding and a full-bridge rectifier coupled to the secondary winding through the inductor and a resonance capacitor.

Any one of the foregoing examples may be combined with any one or more of the other foregoing examples to create a new embodiment within the scope of the present disclosure.

DETAILED DESCRIPTION

Figure 1:
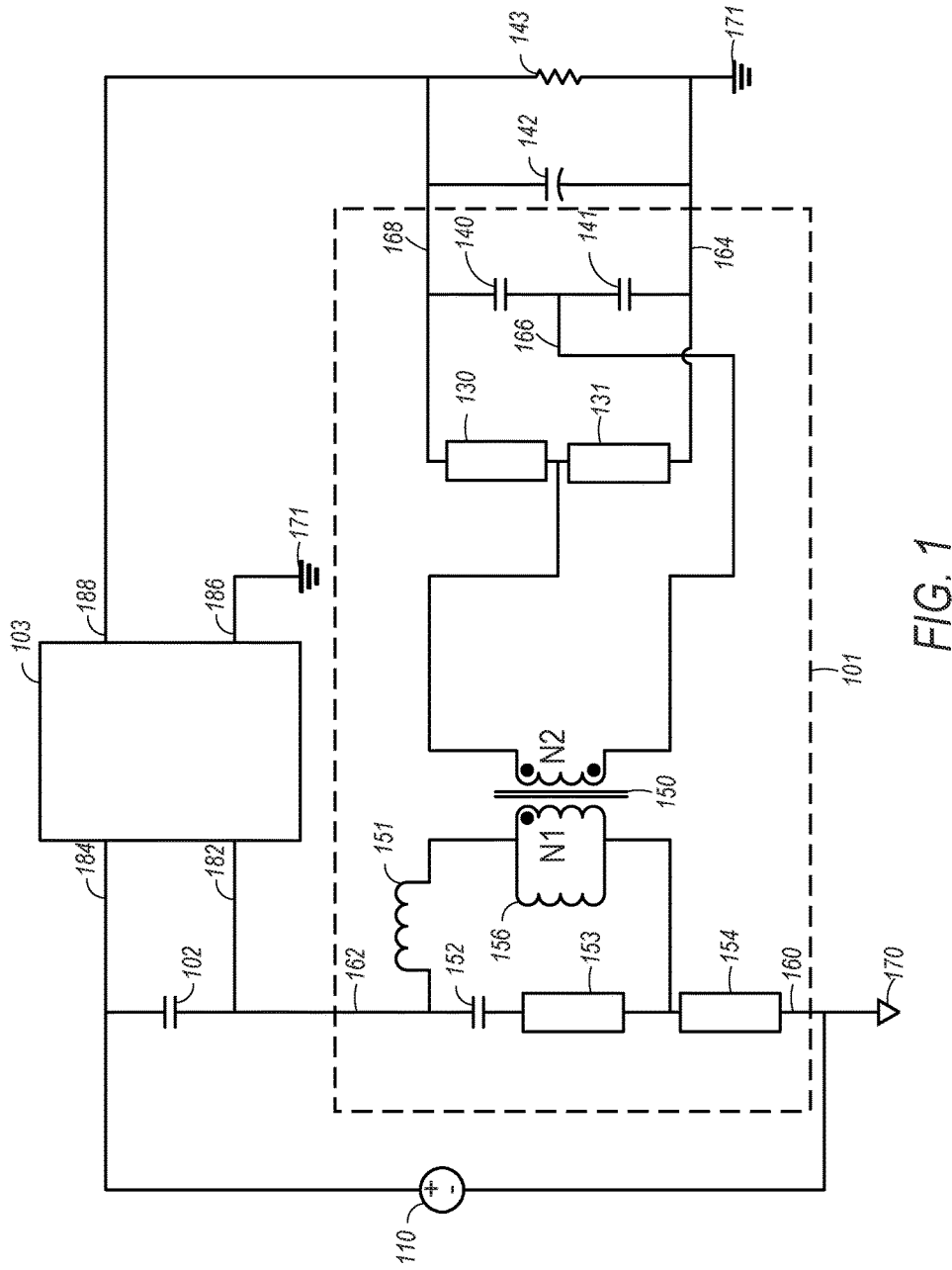
FIG. 1 is a schematic diagram of an ISOP-type partial power processing converter circuit system, according to an example embodiment.

Partial power processing converter circuits, such as IPOS and ISOP types of power converters, are used in power supplies to convert one DC voltage to another DC voltage. By designing voltage regulation capability just as needed and as appropriate for a target application, the overall efficiency of the whole power converter may be optimized.

Using partial power processing approaches, some portions of the total power are processed through very high efficiency power processing paths via a direct power transfer path without active power processing, or via circuits using a minimum amount of active power processing effort, such as unregulated power conversion circuits, to achieve the best efficiency for these portions of power. In the meantime, the rest of the power is processed by regulated power conversion circuits to achieve desired voltage regulation capability for the whole converter.

A partial power processing converter generally exhibits narrower voltage regulation range but better power conversion efficiency compared to the regulated power conversion circuits of which the whole converter is consists. In other words, partial power processing methods provide some extra degrees of freedom to optimize the overall converter design and achieve the best results. Partial power processing circuits can boost efficiency since part of the input power is processed with a minimum amount of active power processing. Also, the power processing may be accomplished through high efficiency power processing paths such as unregulated converters.

Partial power processing is a methodology that is able to achieve substantially better balance between voltage regulation capability and power conversion efficiency. ISOP and IPOS circuits are two forms of partial power processing converter circuits.

ISOP (Input Series Output Parallel) is one of the commonly used architectures to implement partial power processing. A converter of ISOP type is constructed with a plural of sub-converters, where the input ports of the sub-converters are connected in series and their output ports are connected in parallel. When Vin=Vinmin, Vo=Vomax, ISOP type of partial power processing architecture generally produces the best efficiency, since the highest percentage of the total power goes through the high efficiency unregulated power conversion path, and the lowest percentage of the total power goes through the low efficiency regulated power conversion path. However, when Vin=Vinmax and Vo=Vomin, the overall efficiency is the lowest, since the lowest percentage of the total power goes through the high efficiency unregulated power path and the highest percentage of the total power goes through the low efficiency regulated power conversion path.

IPOS (Input Parallel Output Series) is another well adopted architecture to implement partial power processing. A converter of IPOS type is constructed with a plural of sub-converters, where the input ports of the sub-converters are connected in parallel and their output ports are connected in series. The efficiency characteristics of IPOS is opposite to that of ISOP. When Vin=Vinmin, Vo=Vomax, IPOS gives lowest efficiency in general since the lowest percentage of the total power goes through the high efficiency unregulated power path. While for Vin=Vinmax and Vo=Vomin, the overall efficiency is the highest since the highest percentage of the total power goes through the high efficiency unregulated power path.

There is also an ISOS (Input Series Output Series) architecture where the input ports of the sub-converters are connected in series and the output ports are connected in series as well. However, since the input currents and output currents of all the sub-converters are forced equal respectively due to series connection, ISOS architecture demands the DC voltage gains of the sub-converter modules be substantially equal to each other. Therefore, an ISOS structure is not quite suitable for partial power processing because unregulated converters and regulated converters cannot have the same DC voltage gain.

Furthermore, a power converter may combine more than one of ISOP, IPOS and ISOS schemes to achieve even better results. For instance, a mixture of ISOP and IPOS may optimize the power efficiency at both ends of the input and output voltage range, i.e., Vi=Vimax, Vo=Vomin, and Vi=Vimin, Vo=Vomax, and as a consequence the overall converter efficiency in the whole input and output voltage range may be improved as well.

The ISOP circuit is a relatively efficient circuit when the input voltage is at the minimum voltage of the input voltage range and the output voltage is at the maximum voltage of the output voltage range. In this scenario, the highest percentage of total power goes through a relatively high efficiency unregulated power path of the circuit. However, when the input voltage is at the maximum voltage of the input voltage range and the output voltage is at the minimum voltage of the output voltage range, the overall efficiency of the ISOP is not as good since the lowest percentage of total power goes through the unregulated power path of the circuit.

The efficiencies of the IPOS circuit are opposite to that of the ISOP circuit. The IPOS circuit has its lowest efficiency when the input voltage is at the minimum voltage of the input voltage range and the output voltage is at the maximum voltage of the output voltage range. In this scenario, the lowest percentage of power goes through the high efficiency unregulated power path. When the input voltage is at the maximum voltage of the input voltage range and the output voltage is at the minimum voltage of the output voltage range, the overall efficiency is best since the highest percentage of total power goes through the high efficiency unregulated power path.

As the size of a conventional power converter circuit is reduced, its power loss and heat generation increases. This is due to the increased resistance of the smaller size circuit as compared to a larger circuit. Conversely, larger power converter circuits have reduced resistances and, thus, generate less heat and power loss. It is desirable to have both a smaller size power processing converter circuit as well as increased efficiency and reduced power loss. The disclosed embodiments include high efficiency isolated ISOP-type partial power processing converters. These circuits provide relatively higher efficiency and relatively lower power loss over a wide input and output voltage range in a reduced size circuit.

As used herein, a regulated DC-to-DC converter provides an output voltage that is stabilized and kept at a relatively constant voltage level. An unregulated DC-to-DC converter provides an output voltage that is loosely proportional to the input voltage and may decrease when the converter is coupled to a load. An isolated DC-to-DC converter typically uses a transformer to galvanically isolate the output from the input of the power stage.

It is well known in the art that a dot on the windings representation of a transformer schematic represents the phase relationship of the windings (e.g., winding polarity). In other words, when a dot is placed at the top of the primary and the secondary windings, it represents that the primary and secondary current and voltages are in phase. A dot at the bottom of the secondary windings represents that the primary and secondary current and voltages are 180° out of phase. In subsequent embodiments, the secondary windings may show dots on both the top and the bottom. This represents a short-hand notation that any circuit coupled to the secondary winding may be coupled either in phase or out of phase with the primary winding.

As used herein, the terms "resonant forward-flyback topology" and "resonant forward-flyback configuration" refer to a configuration in which, while a primary switch is on, a magnetic component works in a resonant forward mode as a transformer to deliver power from a primary side to a secondary side and, while the primary switch is off, the magnetic component works in a flyback mode as an inductor that releases magnetizing current built up during the resonant forward mode.

FIG. 1 is a schematic diagram of an ISOP-type partial power processing converter circuit, according to an example embodiment. The circuit includes a DC power supply 110 and a load having a capacitor 142 and resistor 143. Also shown in the circuit are a regulated DC-to-DC converter 101, an isolated DC-to-DC converter 103, capacitors 102, 140, 141, and 152, a transformer 150, transistors 130, 131, 153, and 154, inductors 151 and 156, and grounds 170 and 171. The input voltage to the regulated DC-to-DC converter 101 is provided across negative node 160 and positive node 162. The output voltage from the regulated DC-to-DC converter 101 is measured across negative node 164 and positive node 168. Thus, a load coupled to the output of the regulated DC-to-DC converter 101 would have a positive terminal connected to the positive output node 168 and a negative terminal connected to the negative output node 164. In some example embodiments, the flyback node 166 allows direct measurement of the flyback voltage (between the flyback node 166 and the negative node 164) and the forward voltage (between the positive node 168 and the flyback node 166).

The example embodiment of FIG. 1 is an ISOP-type partial power processing converter circuit because the inputs to the unregulated DC-to-DC converter 103 and the inputs to the regulated DC-to-DC converter 101 are in series and the outputs are in parallel. The input voltage from the DC power supply 110 is divided between the inputs to the two DC-to-DC converters 101 and 103 and the outputs of the two converters are coupled to each other. In the example of FIG. 1, the output voltage of the unregulated DC-to-DC converter 103 is connected in parallel with the output voltage of the regulated DC-to-DC converter 101 (at the positive node 168).

The ISOP-type partial power processing converter circuit of FIG. 1 uses a regulated DC-to-DC converter 101 with a resonant forward-flyback converter topology and an unregulated, isolated DC-to-DC converter 103, and their inputs are connected in series and outputs are connected in parallel. The converter circuit includes the regulated DC-to-DC converter 101 and the unregulated, isolated DC-to-DC converter 103. The regulated DC-to-DC converter 101 comprises a resonant forward-flyback converter configuration. The transistor 154 acts as a primary switch. When the primary switch is turned on, the resonant forward-flyback converter operates in resonant forward mode. In the resonant forward mode, the transformer 150 delivers power from the primary side to the secondary side and a magnetizing current is linearly built up in the inductor 156. When the primary switch is turned off, the resonant forward-flyback converter operates in flyback mode. In the flyback mode, the transformer 150 acts as an inductor, transferring the magnetizing current from the inductor 156 on the primary side to the windings on the secondary side.

The unregulated, isolated DC-to-DC converter 103 may be implemented in a different ways in different example embodiments. For example, the DC-to-DC converter 103 may be implemented as an LLC resonant converter operating around a resonant frequency and 0.5 duty cycle, a phase shifted full bridge converter operating around 0.5 duty cycle, or any other unregulated high efficiency isolated converter topology.

The positive input node 184 of the unregulated DC-to-DC converter 103 is coupled to the positive side of the DC power source 110. A capacitor 102 is coupled between the inputs of the DC-to-DC converter 103. An input voltage for the unregulated DC-to-DC converter 103 is produced across the capacitor 102. The negative input node 182 of the unregulated DC-to-DC converter 103 is coupled to the positive input node 164 of the regulated DC-to-DC converter 101, and the negative input node 160 of regulated DC-to-DC converter 101 is coupled to the primary circuit ground 170 and the negative terminal of the DC power source 110. The primary circuit ground 170 may be an Earth ground. The negative output node 186 of the unregulated DC-to-DC converter 103 is coupled to the secondary circuit ground 171. The secondary circuit ground 171 may be a floating ground.

The regulated DC-to-DC converter 101 includes a pair of series coupled transistors 153 and 154 coupled in series with a clamping capacitor 152 that is coupled to the negative input node 182 of the unregulated DC-to-DC converter 103. In an embodiment, the transistors are N-type field effect transistors (NFET) and are connected as a half-bridge inverter to convert the DC voltage to an AC voltage. The source terminal of the lower transistor 154 is coupled to the primary circuit ground 170.

A first inductor 156, which is the flyback inductor, is coupled in parallel with a primary winding, having N1 turns, of a transformer 150. The flyback inductor 156 may be the magnetizing inductance of the transformer 150, or a discrete inductor. A second inductor 151 (e.g., having forward resonance inductance Lr) is coupled between a first terminal of the primary winding and the common node of the clamping capacitor 152 and the capacitor 102 (i.e., the positive input node 162 of the regulated DC-to-DC converter 101). A common node between the transistors 153 and 154 is coupled to a second terminal of the primary winding of the transformer 150.

The secondary winding of the transformer 150 includes N2 turns. The secondary winding has one terminal coupled to a common node between a pair of series coupled transistors 130 and 131 (e.g., NFET) connected as a half-bridge rectifier to convert the AC voltage to a DC voltage. The common node between the pair of series coupled transistors 130 and 131 of the half-bridge rectifier may also be referred to as the midpoint of the half-bridge rectifier. A second terminal of the secondary winding is coupled to a common node between a pair of series coupled capacitors 140 and 141. The series coupled capacitors 140 and 141 are coupled in parallel with the series coupled transistors 130 and 131 and are both coupled in parallel with the load capacitor 142 and load resistor 143.

The second inductor 151 acts as a resonance inductance for the forward mode operation of the regulated DC-to-DC converter 101. A resonance capacitor is formed by the secondary side half-bridge capacitors 140 and 141 having capacitances Cb1 and Cb2, respectively. When the capacitors 140 and 141 are reflected to the primary side of the transformer 150, the equivalent resonance capacitor, having capacitance $C_r$, may be represented by $C_r=(Cb1+Cb2)\times(N2/N1)^2$. The resonant frequency of the resonant forward conversion may be represented by $f_r=1/2\pi\sqrt{L_r * C_r}$. The input-to-output DC voltage gain of the regulated DC-to-DC converter 101 topology may be approximated by $M2=V_O/V_i=(N2/N1)/(1-D)$, where $V_i$ is the voltage provided by the DC power source 110, $V_o$ is the forward output voltage measured across the positive output node 168 and the negative output node 164, and D represents the switching duty cycle of the transistor 154. This DC gain characteristics is essentially the same as a boost converter topology.

The resonant forward mode of the regulated DC-to-DC converter 101 can perform power conversion very efficiently due to the resonant power conversion nature, but on the other hand it provides limited voltage regulation capability. The regulated isolated resonant forward-flyback DC-to-DC converter 101 can be considered an IPOS type of DC-to-DC converter where the flyback conversion mode provides voltage regulation and the resonant forward mode provides a high efficiency power conversion path. Therefore, the overall isolated DC-to-DC converter comprising the unregulated isolated DC-to-DC converter 103 and the regulated isolated resonant forward-flyback DC-to-DC converter 101 combines the mechanisms of ISOP and IPOS types of power conversion, thus inheriting the merits of both ISOP and IPOS types of power converters.

Resonant forward mode usually only needs a relatively small resonant inductance, which is often small enough to use the transformer leakage inductances as the resonant inductor 151. By increasing the resonant inductance, the resonant forward mode will become more and more of pulse width modulation (PWM) forward mode and obtain the stepping-down voltage regulation capability of a conventional PWM mode forward converter, and the isolated resonant forward-flyback DC-to-DC converter 101 will also become more and more of a PWM-mode isolated forward-flyback converter with wider voltage regulation range but lower power efficiency.

On the primary side of the transformer 150, the forward resonant inductor 151 with inductance $L_r$, may be placed in series with the transformer primary winding, as shown, or the secondary winding, or both. The resonant inductor 151 may be integrated into the transformer 150. The transformer leakage inductances may be used as the forward resonant inductance. This integration approach reduces the component count. To reduce the voltage stress on the primary side transistors 153 and 154 under lightning or line surge conditions, the clamping capacitor 152 may alternatively be connected from transistor 153 drain to the primary circuit ground 170 instead of from transistor 153 drain to the positive input node 162 as shown in FIG. 1. A bulk capacitance at the input of the regulated DC-to-DC converter 101 may be minimized to expedite the response of the regulated DC-to-DC converter 101 to input voltage changes and reduce the voltage disturbances being passed from the input to the output through the unregulated DC-to-DC converter 103.

On the secondary side of the transformer 150, multiple secondary windings may be used. For example, a different number of turns may be used on a forward portion of the secondary windings as compared to a flyback portion. Output voltages may be available separately from the forward portion and the flyback portion. This adds design flexibility to achieve various input-to-output voltage gain characteristics. A half-bridge or full-bridge rectifier may be coupled to the secondary winding. Also, the secondary side transistors 130, 131 can be synchronously controlled switches or diode rectifiers.

The regulated DC-to-DC converter 101 is shown connected below the unregulated DC-to-DC converter 103 in FIG. 1. Other embodiments may place the regulated DC-to-DC converter 101 above the unregulated DC-to-DC converter 103 while their input ports are still connected in series. The only difference would be which DC-to-DC converter 101, 103 is preferred to be referenced to secondary circuit ground 171.

The output voltage of the unregulated DC-to-DC converter 103 can also be connected to the flyback portion of the resonant forward-flyback converter output voltage. In other words, the voltage across capacitor 141 may be used instead of the resonant forward-flyback converter output voltage when connecting the output voltage of the unregulated DC-to-DC converter 103 to the resonant forward-flyback DC-to-DC converter 101. The above-described embodiments, as well as others, are illustrated in FIGS. 2-11 and described subsequently.

FIGS. 2-11 are schematic diagrams of different embodiments of the ISOP-type partial power processing converter, according to various embodiments. These embodiments are for purposes of illustration only as other embodiments may be realized using the basic topology of FIG. 1.

Figure 2:
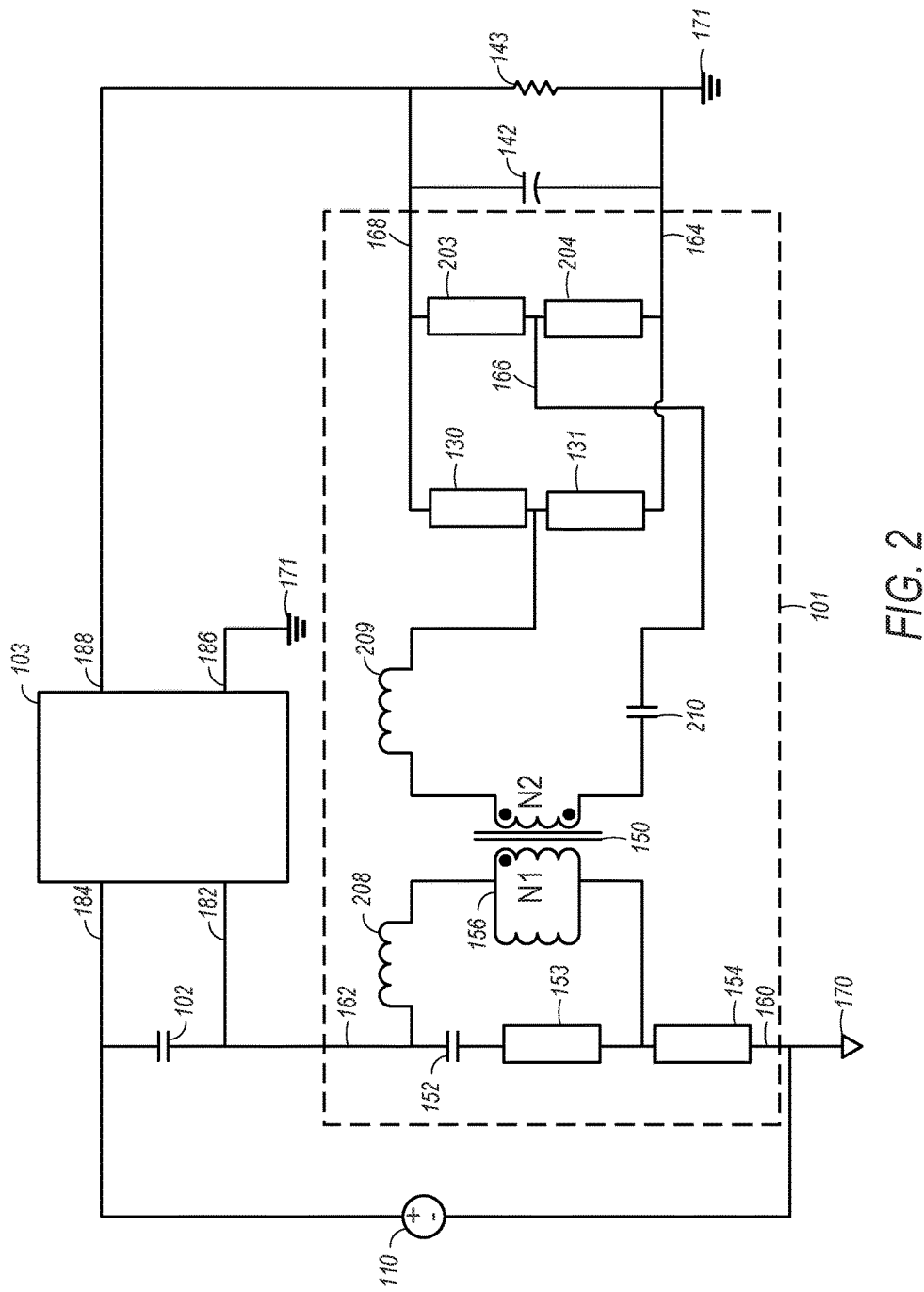
FIGS. 2-11 are schematic diagrams of different embodiments of the ISOP-type partial power processing converter, according to various embodiments.

The embodiment of FIG. 2 shows the converter of FIG. 1 with the addition of an inductor 209 in the secondary winding and replacement of the capacitors 140 and 141 of FIG. 1 with the transistors 203 and 204. Thus, the half-bridge rectifier of FIG. 1 (comprising transistors 130 and 131) is effectively replaced with a full-bridge rectifier that comprises transistors 130, 131, 203, and 204, divided into two series pairs. Also shown in FIG. 2 is an inductor 208 and a capacitor 210.

In this embodiment, the forward-flyback transformer leakage inductors 208 and 209 are used as the forward resonance inductance. Additionally, the full-bridge rectifier 200 is located on the resonant forward-flyback converter output side and is coupled to the secondary winding through the inductor 209 and the resonance capacitor 210.

Figure 3:
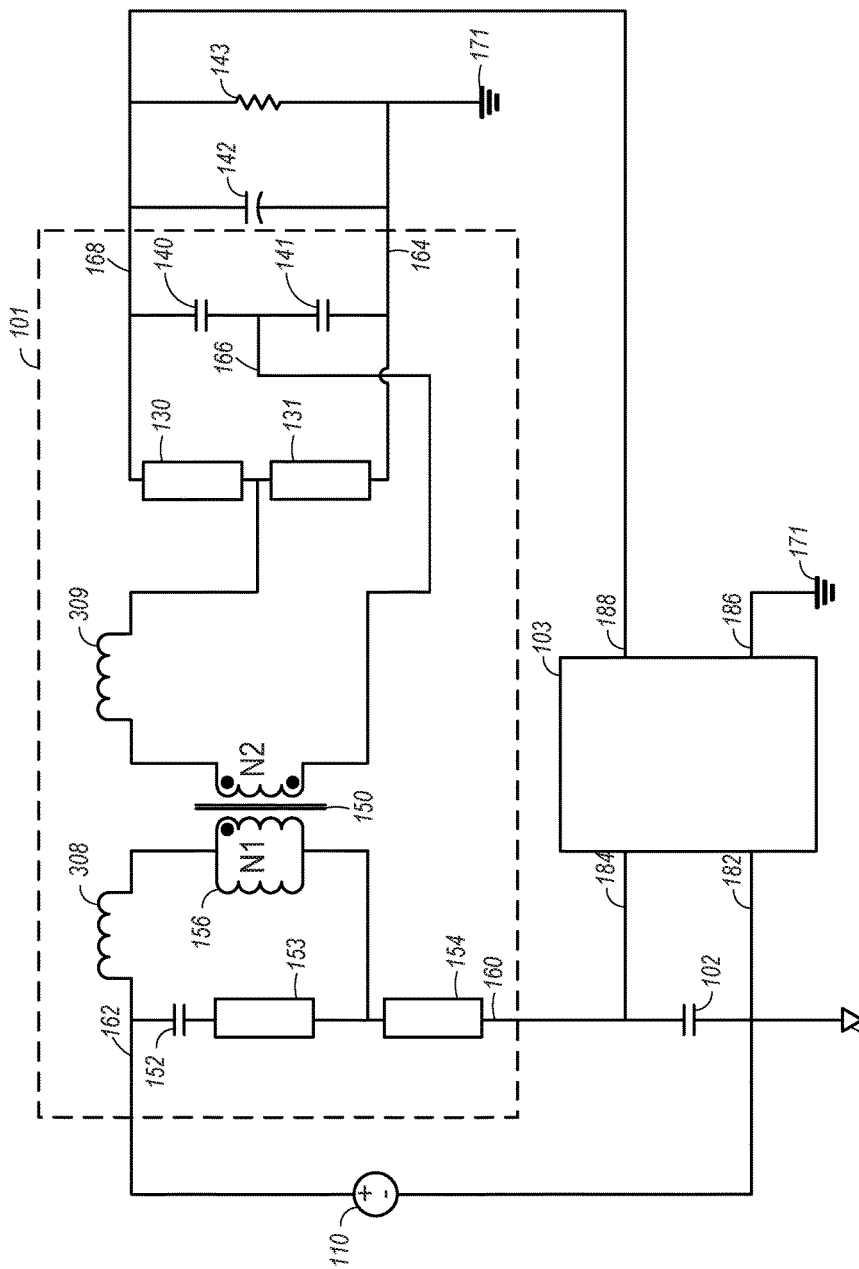

The embodiment of FIG. 3 shows the converter of FIG. 1 where the unregulated DC-to-DC converter 103 is on the bottom to be referenced to ground by coupling the input node 182 to the circuit ground node 170. Thus, the regulated DC-to-DC converter 101 is placed on top. In this embodiment, the forward-flyback transformer leakage inductors 308 and 309 are used as the forward resonance inductance.

Figure 4:
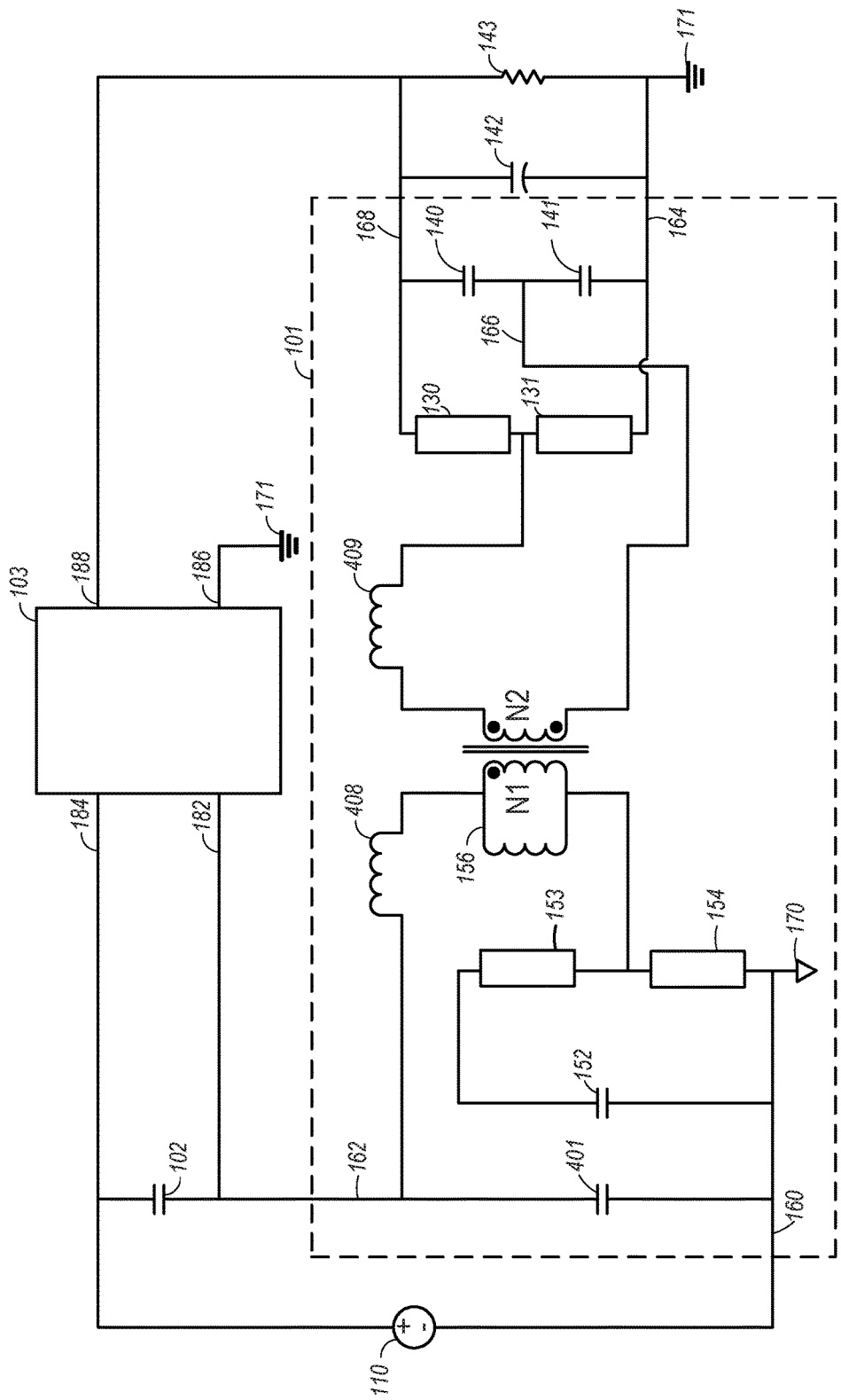

The embodiment of FIG. 4 shows the converter of FIG. 1 where clamping capacitor 152 is now coupled from the transistor 153 drain to the primary circuit ground 170 instead of from the transistor 153 drain to the positive input node 162 of the regulated DC-to-DC converter 101, as shown in FIG. 1. This topology may reduce the voltage stress on transistors 153 and 154 under lighting or line surge conditions by avoiding the input voltage surge from being passed to the transistors 153 and 154 through the capacitor 152. The input capacitor 401 of the regulated DC-to-DC converter 101 may be minimized to expedite the response of the regulated DC-to-DC converter 101 to input voltage changes, since the majority of the input voltage variation now appears on the input of the regulated DC-to-DC converter 101 and the unregulated DC-to-DC converter 103 sees very little of the input voltage variation. Consequently, this may also reduce the input voltage disturbances being passed to the output through the unregulated DC-to-DC converter 103. In this embodiment, the forward-flyback transformer leakage inductors 408 and 409 are used as the forward resonance inductance.

Figure 5:
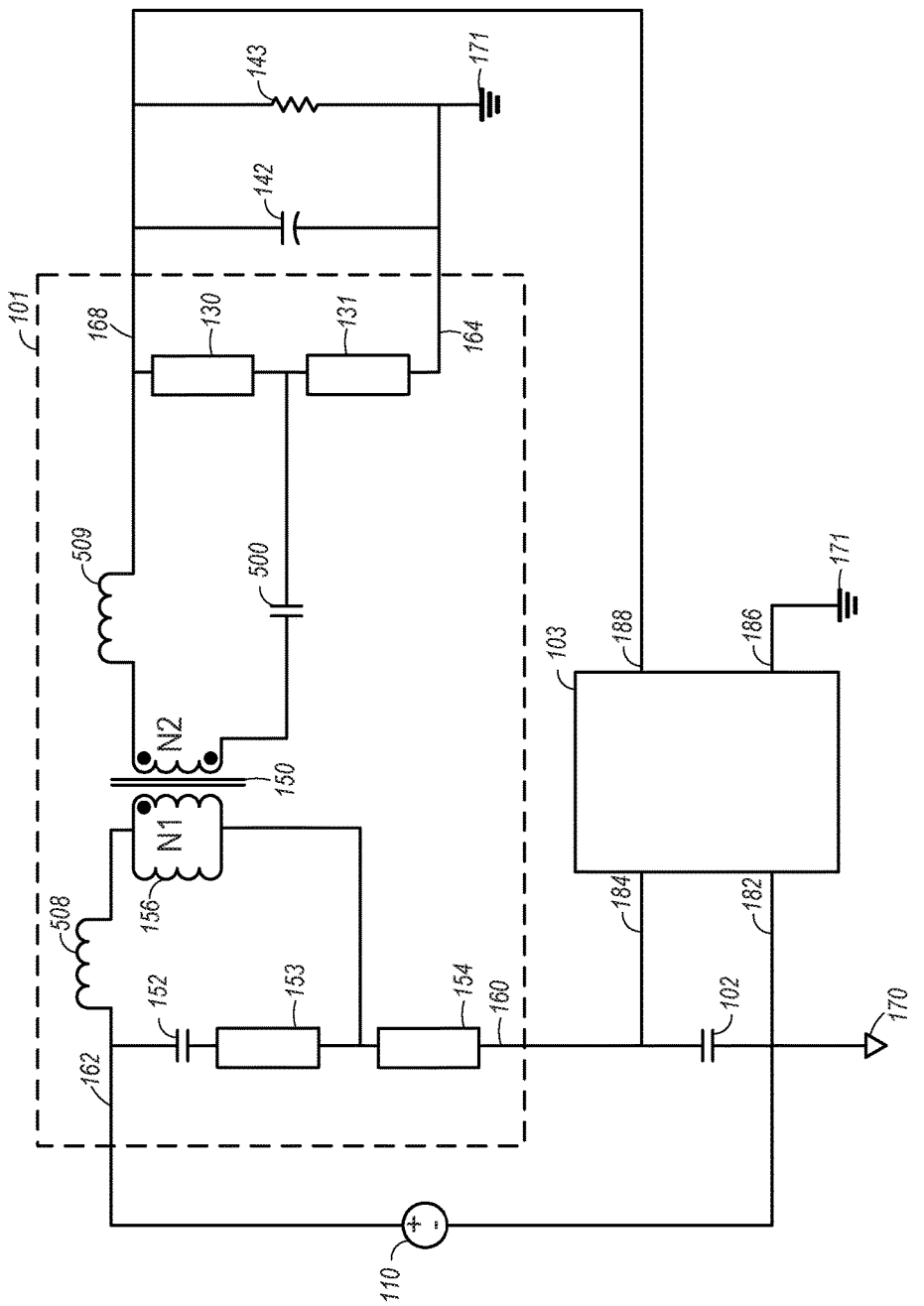

FIG. 5 shows the converter of FIG. 1 where the unregulated DC-to-DC converter 103 is on the bottom and referenced to circuit ground. The capacitors 140 and 141 on the secondary side of the transformer of the circuit of FIG. 1 have been combined into one capacitor 500 with capacitance Cb. If reflected to the primary side, it can be represented by $C_r = (C_b)(N2/N1)^2$. Also on the secondary side, the forward portion and the flyback portion both share the same secondary winding and, thus, have the same number of turns. In other words $N_{fw} = N_{fb} = N2$. In this embodiment, the forward-flyback transformer leakage inductors 508 and 509 are used as the forward resonance inductance.

In some example embodiments of FIG. 5, the secondary windings have the same relative polarity as the primary windings (i.e., in dot notation, the dot on the right side of the transformer 150 is at the top, like the lot on the left side). In these example embodiments, the flyback voltage may be measured across the capacitor 500. The forward voltage may be calculated by measuring the output voltage across nodes 168 and 164 and subtracting the flyback voltage, but cannot be measured directly.

In other example embodiments of FIG. 5, the secondary windings have opposite relative polarity to the primary windings (i.e., in dot notation, the dot on the right side of the transformer 150 is at the bottom, unlike the dot on the left side). In these example embodiments, the forward voltage may be measured across the capacitor 500. The flyback voltage may be calculated by measuring the output voltage across nodes 168 and 164 and subtracting the forward voltage, but cannot be measured directly.

Figure 6:
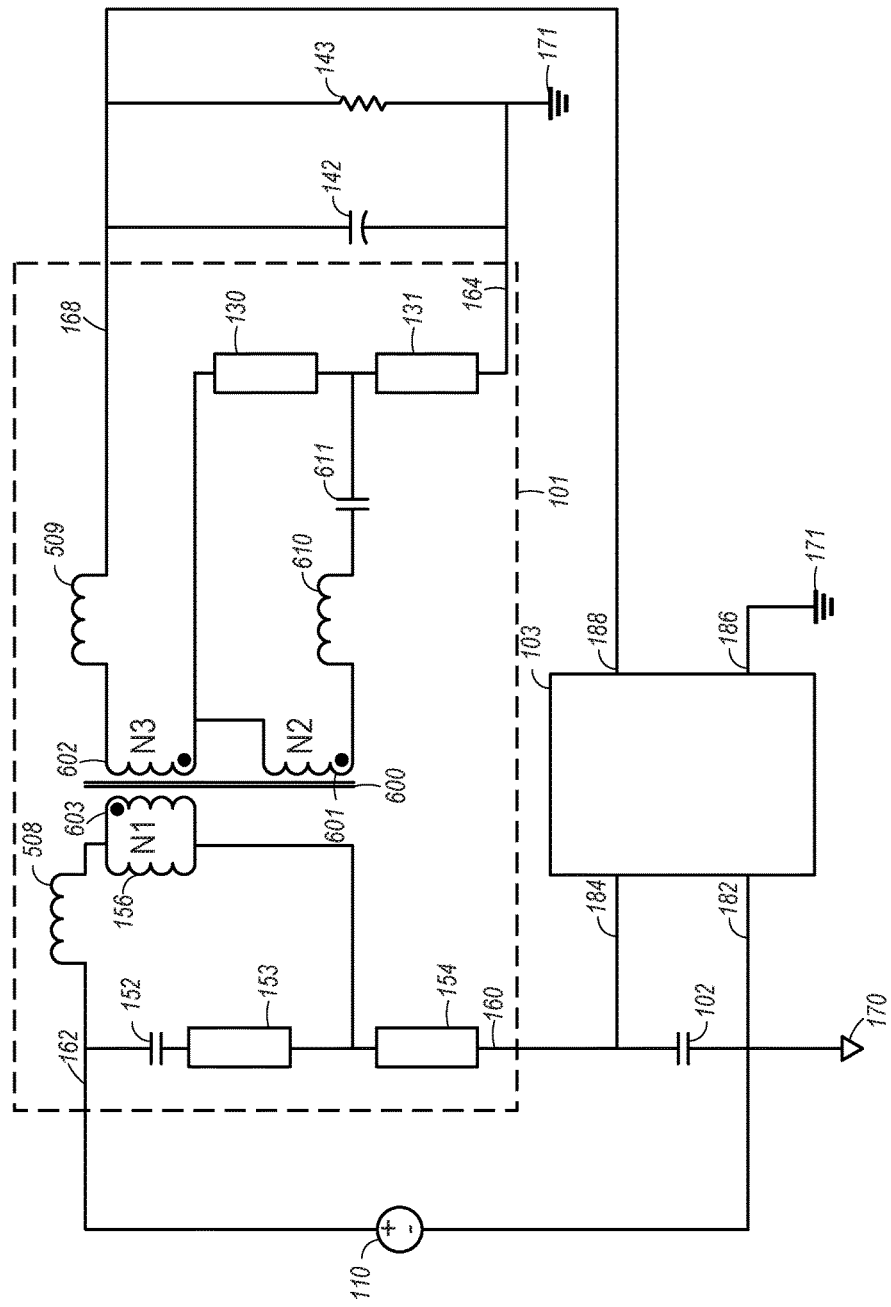

The embodiment of FIG. 6 shows the converter of FIG. 5 where the transformer 150 has been replaced with the transformer 600. The primary side of the transformer 600 includes a primary winding 603 with N1 turns. The secondary side of the transformer 600 includes a first secondary winding 601 having N2 turns and a second secondary winding 602 having N3 turns. The relative polarity of the secondary windings 601 and 602 are opposite to the relative polarity of the primary winding 603. The secondary winding 601 having N2 turns is used for the forward portion while both the secondary windings 601 and 602 are used for the flyback portion. Thus, the forward and flyback portions of the transformer 600 have different numbers of turns. In other words, $N_{fw} = N2$ and $N_{fb} = N2 + N3$ so that $N_{fw} < N_{fb}$. In this embodiment, the forward-flyback transformer leakage inductors 508, 509, and 610 are used as the forward resonance inductance. The capacitor 611 on the secondary side is the resonant capacitance. If the capacitor 611 were reflected to the primary side, the effective capacitance would be the capacitance of the capacitor 611 multiplied by the square of the ratio of N2 to N1.

Figure 7:
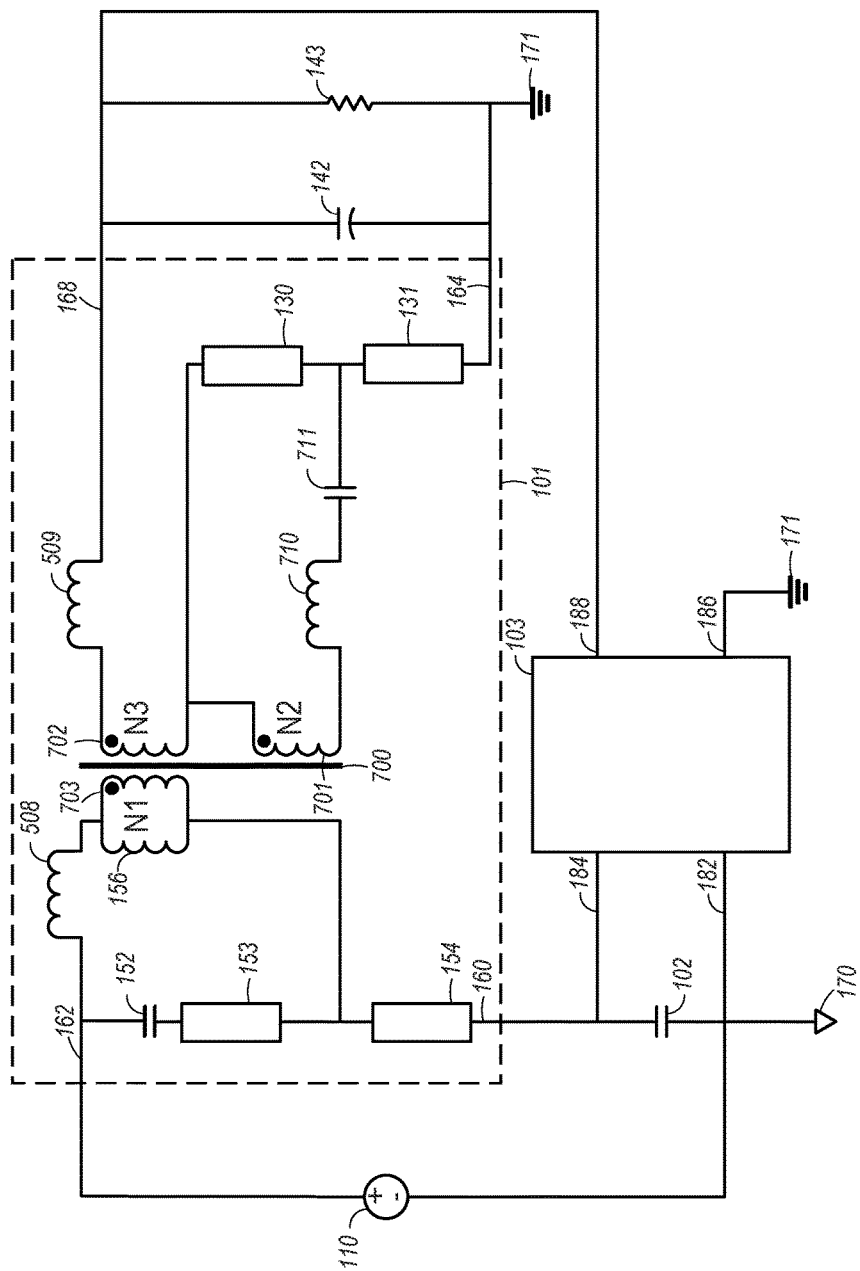

The embodiment of FIG. 7 shows the converter of FIG. 5 where the transformer 150 has been replaced with the transformer 700. The primary side of the transformer 700 includes a primary winding 703 having N3 turns. The secondary side of the transformer 700 includes a first secondary winding 701 having N2 turns and a second secondary winding 702 having N3 turns. Both of the secondary windings 701 and 702 are used for the forward portion while the secondary winding 701 with N2 turns is used for the flyback portion. Thus, the forward and flyback portions of the transformer 700 have different numbers of turns. In other words, $N_{fb} = N2$ and $N_{fw} = N2 + N3$ so that $N_{fw} > N_{fb}$. In this embodiment, the forward-flyback transformer leakage inductors 508, 509, and 710 are used as the forward resonance inductance. The capacitor 711 on the secondary side is the resonant capacitance.

Figure 8:
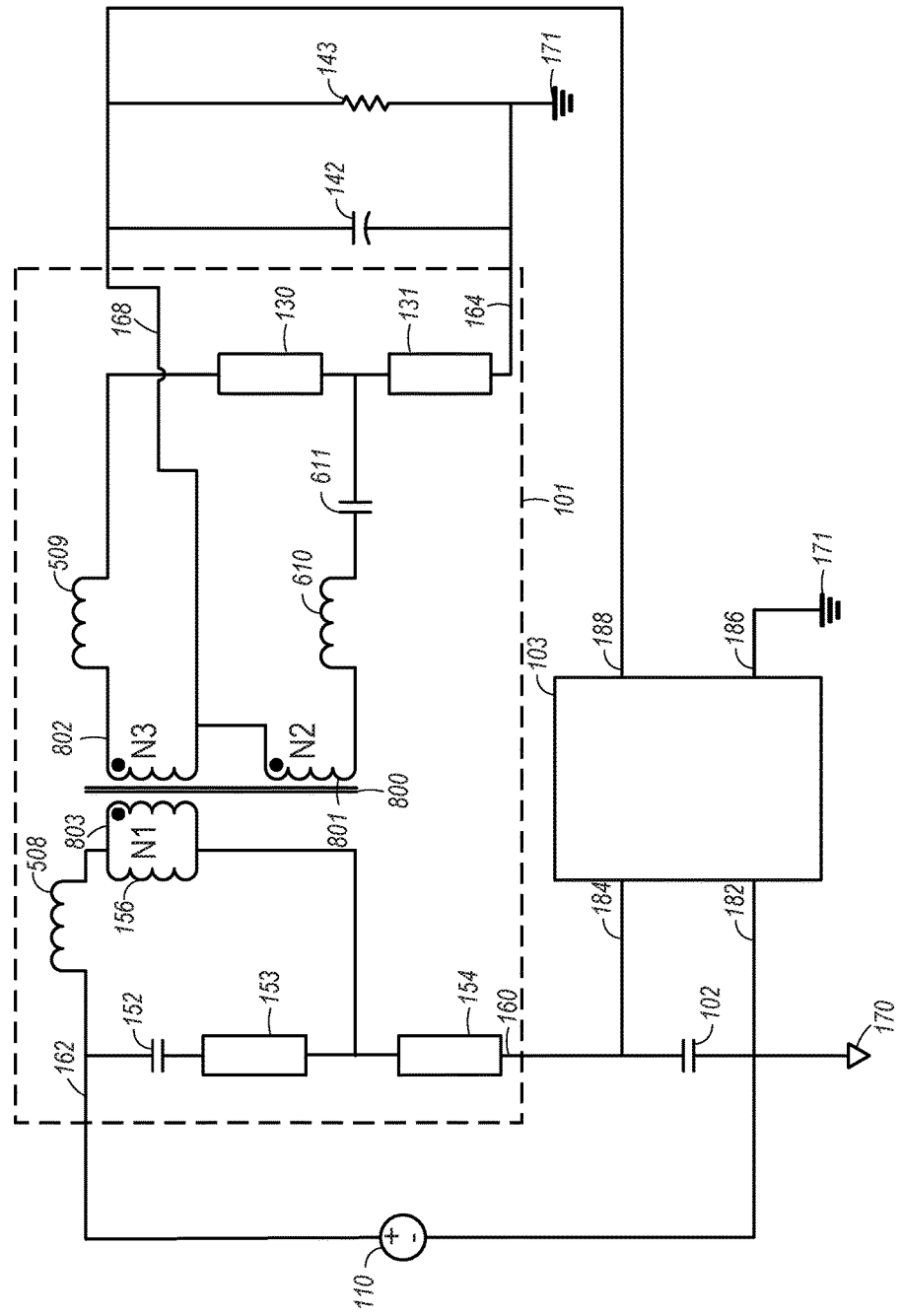

The embodiment of FIG. 8 shows the converter of FIG. 6 where the transformer 600 has been replaced with the transformer 800. The primary side of the transformer 800 includes a primary winding 803 having N1 turns. The secondary side of the transformer 800 includes a first secondary winding 801 having N2 turns and a second secondary winding 802 having N3 turns. The relative polarity of the secondary windings 801 and 802 are the same as the relative polarity of the primary winding 803. The secondary winding 801 having N2 turns is used for the forward portion while both the secondary windings 801, 802 are used for the flyback portion. Thus, the forward and flyback portions have different numbers of turns. In other words, $N_{fw}=N2$ and $N_{fb}=N2+N3$ so that $N_{fw}<N_{fb}$. In this embodiment, the output voltage is tapped off of both of the secondary windings 801 and 802.

Figure 9:
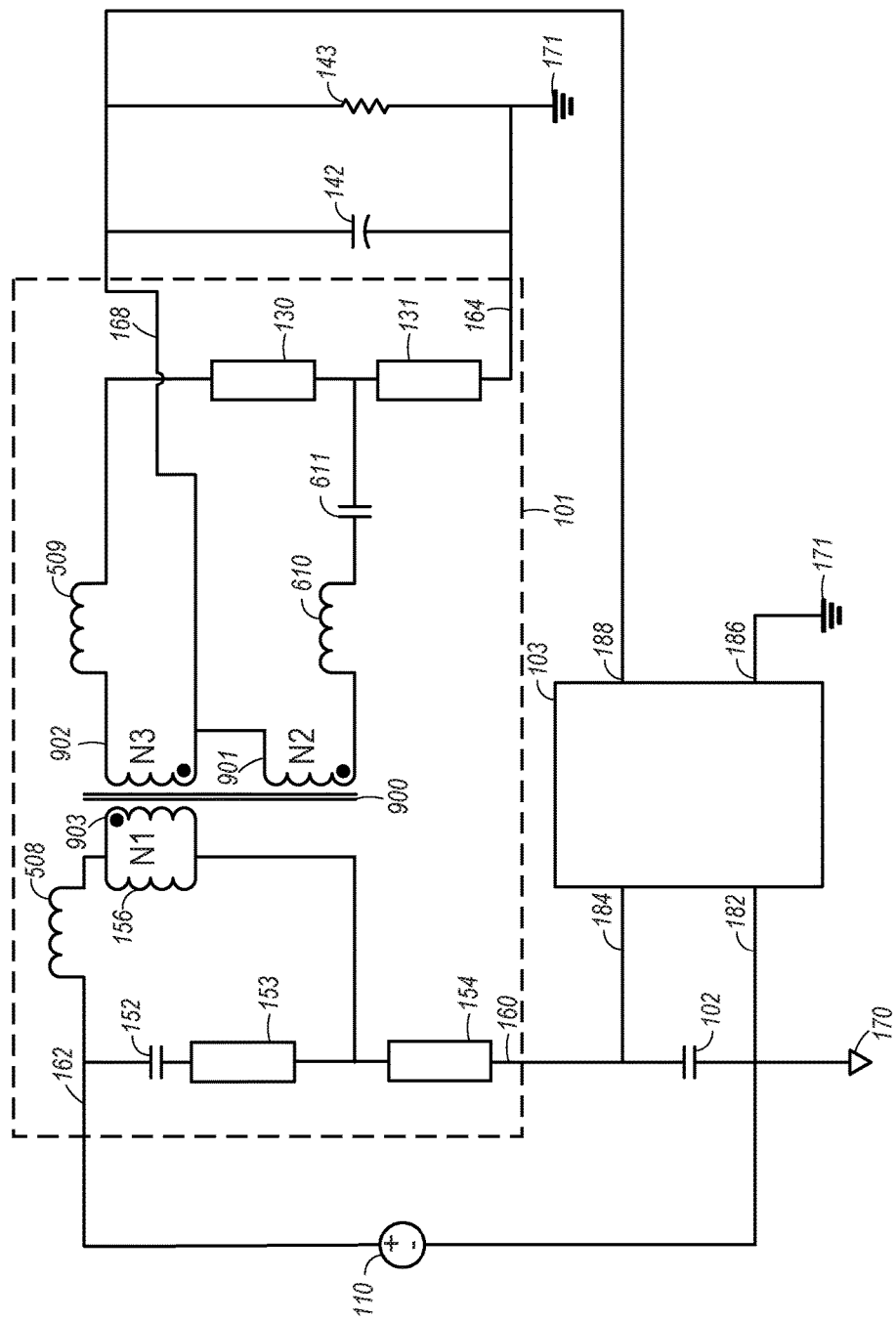

The embodiment of FIG. 9 shows the converter of FIG. 8 where the transformer 800 has been replaced with the transformer 900. The secondary side of the transformer 900 includes a first secondary winding 901 having N2 turns and a second secondary winding 902 having N3 turns. The relative polarity of the secondary windings 801 and 802 are the opposite of the relative polarity of the primary winding 803. Both of the secondary windings 901 and 902 are used for the forward portion while the secondary winding 901 with N2 turns is used for the flyback portion. Thus, the forward and flyback portions have different numbers of turns. In other words, $N_{fb}=N2$ and $N_{fw}=N2+N3$ so that $N_{fw}>N_{fb}$. In this embodiment, the output voltage is tapped off of both secondary windings 901 and 902.

Figure 10:
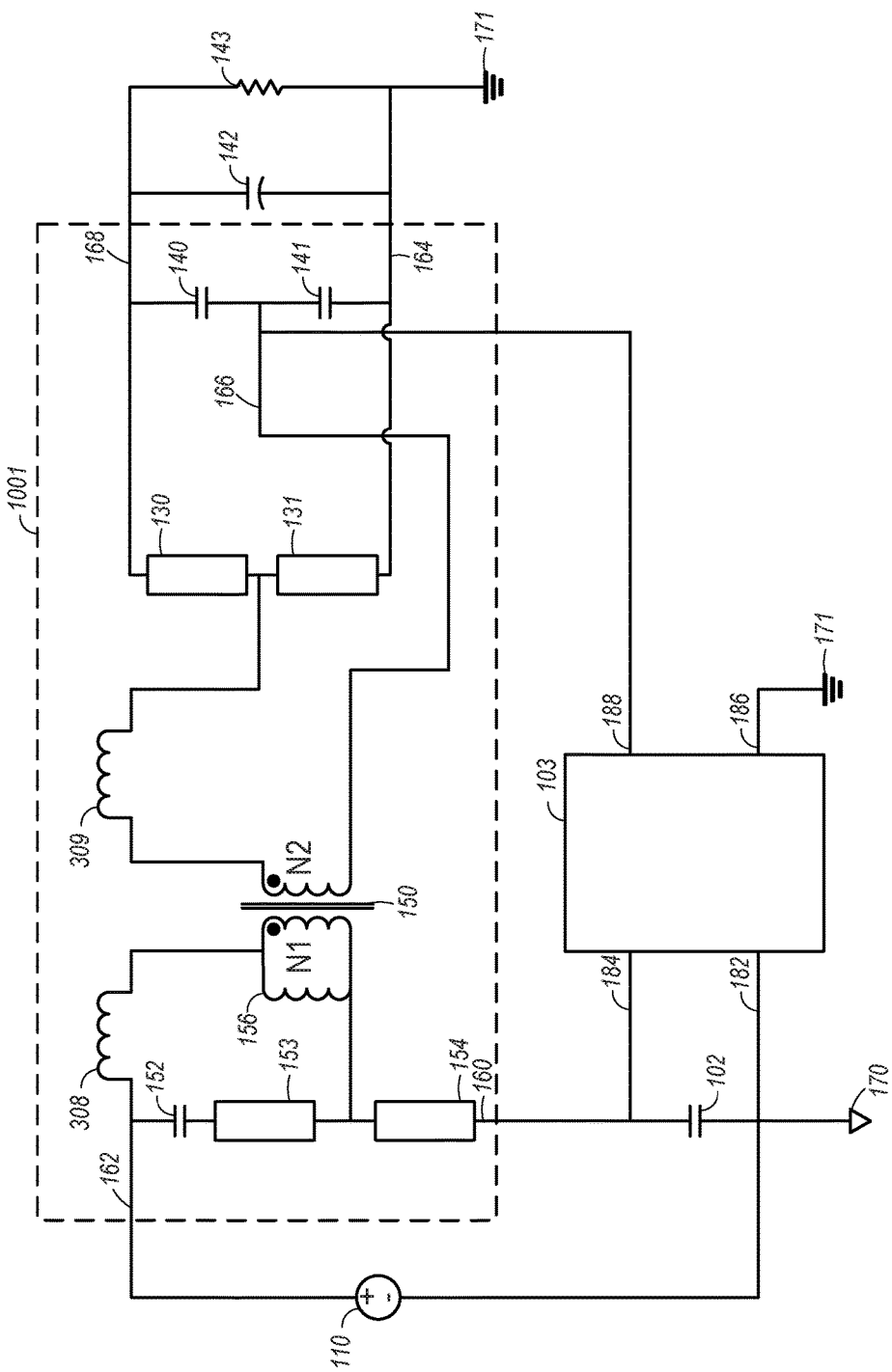

The embodiment of FIG. 10 shows the converter of FIG. 3 where the regulated DC-to-DC converter 101 is replaced with the regulated DC-to-DC converter 1001. Compared to the regulated DC-to-DC converter 101, the regulated DC-to-DC converter 1001 has an additional external connection to the flyback output node 166.

The embodiment of FIG. 10 is thus a series-input, partially-parallel output type. The input voltage from the DC power supply 110 is divided between the inputs to the two DC-to-DC converters 1001 and 103 and the output of the unregulated DC-to-DC converter 103 is coupled to the flyback voltage of the regulated DC-to-DC converter 1001. The positive output node 188 of the unregulated DC-to-DC converter 103 is coupled to the flyback portion of the regulated DC-to-DC converter 1001 (at the node 166) instead of to the output voltage (at the node 168).

Figure 11:
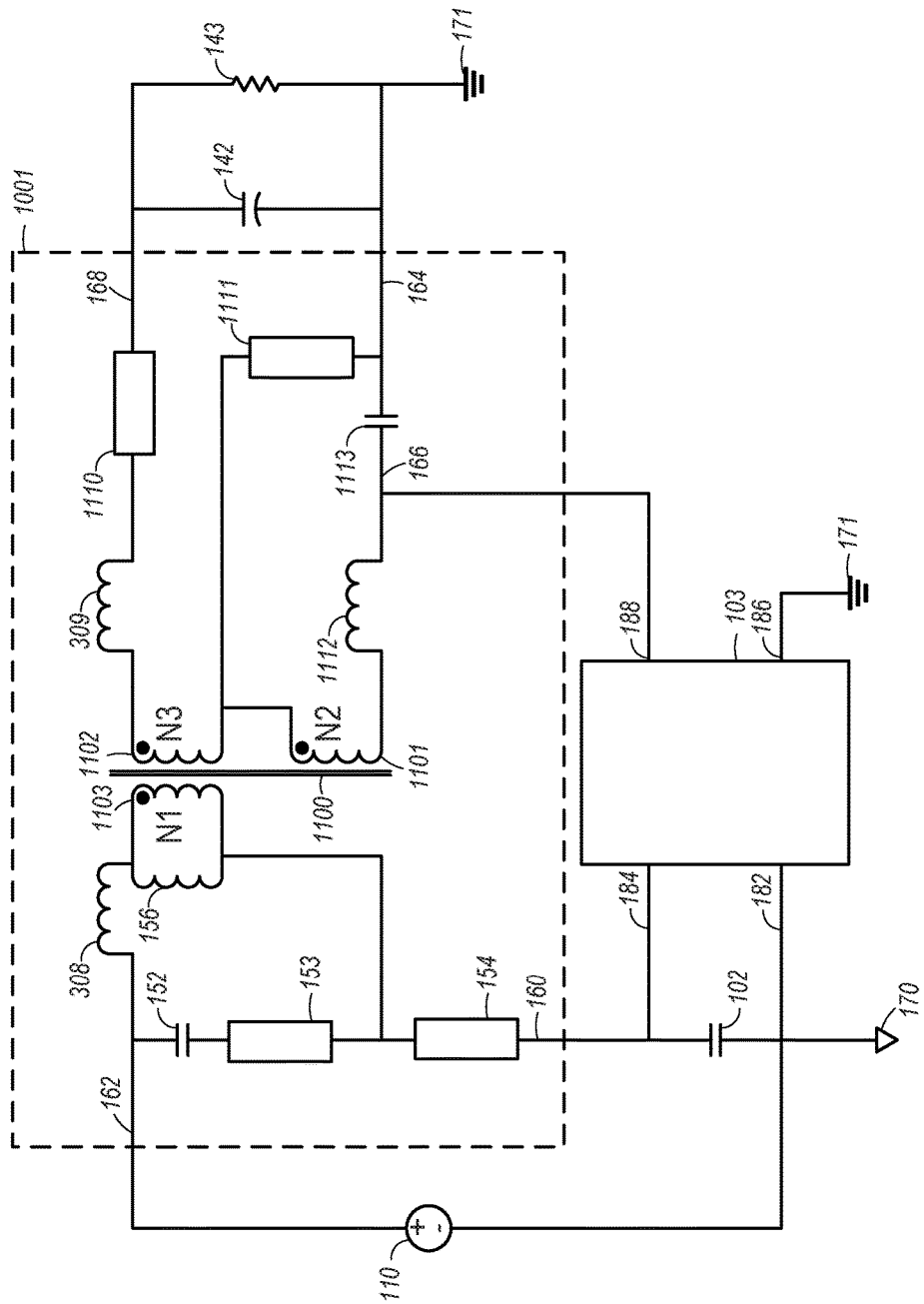

The embodiment of FIG. 11 shows the converter of FIG. 10 where the transformer 150 has been replaced with the transformer 1100. The primary side of the transformer 1100 includes a primary winding 1103 having N1 turns. The secondary side of the transformer 1100 includes a first secondary winding 1101 having N2 turns and a second secondary winding 1102 having N3 turns. The N2 and N3 windings 1101 and 1102 are used for the forward portion and the N2 winding 1101 is used for the flyback portion. Thus, the forward portion and the flyback portion have different number of turns (i.e., $N_{fw}=N2+N3$, $N_{fb}=N2$, $N_{fw}>N_{fb}$). This is accomplished by coupling a transistor 1110 in series with the output line from the transformer winding 1102. A transistor 1111 is coupled between the capacitor 1113 and the two secondary windings 1101 and 1102. In this embodiment, the forward-flyback transformer leakage inductors 308, 309, and 1112 are used as the forward resonance inductance. The capacitor 1113 on the secondary side is the resonant capacitance.

Figure 12:
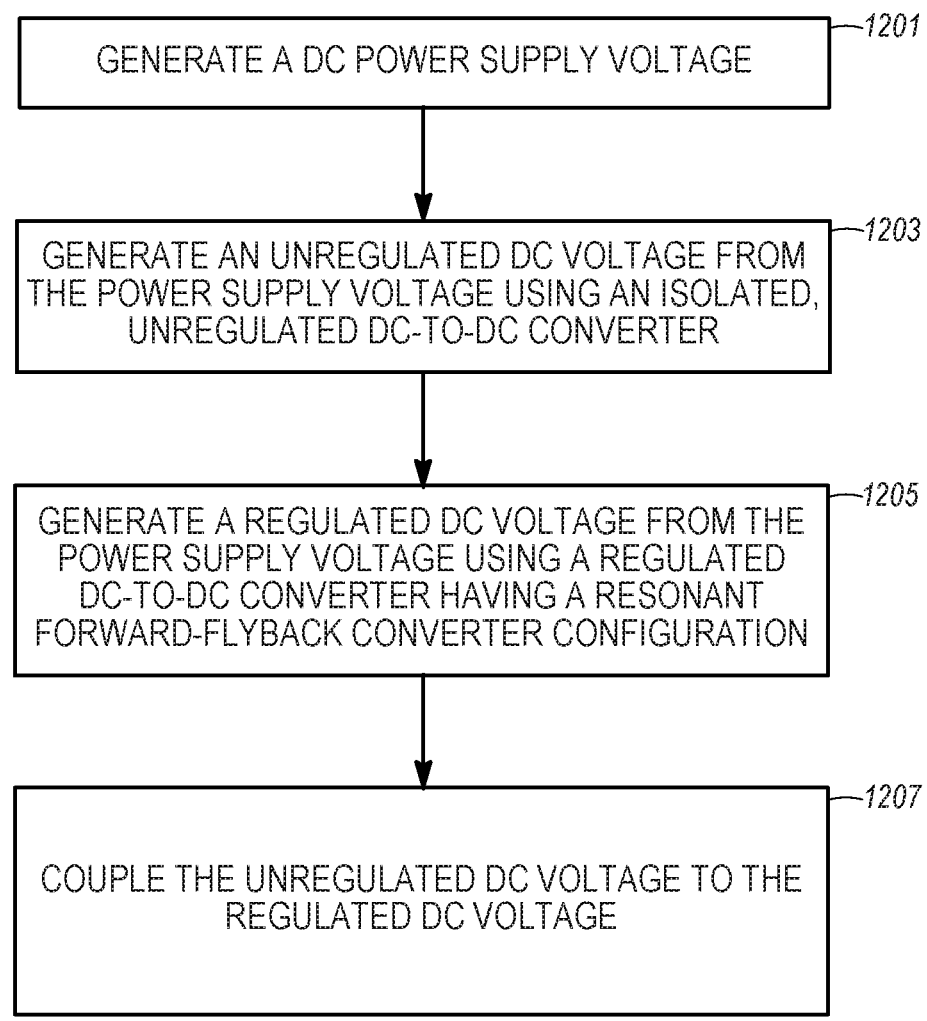
FIG. 12 is a flowchart of a method for operation of the ISOP-type partial power processing converter circuit, according to various embodiments.

FIG. 12 is a flowchart of a method for operation of the ISOP-type partial power processing converter circuit, according to various embodiments. The method of FIG. 12 includes blocks 1201, 1203, 1205, and 1207. By way of example and not limitation, the blocks are described as being performed by elements depicted in FIGS. 1-11.

In block 1201, a DC power supply voltage is generated. For example, the DC power supply 110 may generate a DC power supply. In block 1203, an unregulated DC voltage is generated from the power supply voltage using an isolated, unregulated DC-to-DC converter. For example, the DC-to-DC converter 101 may generate an unregulated DC voltage from the power supply voltage.

In block 1205, a regulated DC voltage is generated from the power supply voltage with a regulated DC-to-DC converter (e.g., the regulated DC-to-DC converter 101) coupled in parallel with the unregulated DC-to-DC converter and having a resonant forward-flyback converter configuration. In block 1207, the unregulated DC voltage is coupled to a flyback portion of the regulated DC-to-DC converter that is coupled to the load. In alternative example embodiments, the unregulated DC voltage is coupled in parallel with the regulated DC voltage.

In the previous description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. An Input-Series-Output-Parallel (ISOP)-type partial power converter circuit comprising:
    an isolated, unregulated DC-to-DC converter configured to generate a first output voltage at a first output voltage node, the unregulated DC-to-DC converter comprising a resonant converter operating around a resonant frequency and 0.5 duty cycle; and
    a regulated DC-to-DC converter coupled with the unregulated DC-to-DC converter and configured to generate a second output voltage at a second output voltage node, the regulated DC-to-DC converter comprising a resonant forward-flyback converter configuration;
    wherein the first output voltage node is coupled to the second output voltage node.

2. The ISOP-type partial power converter circuit of claim 1, wherein the regulated DC-to-DC converter comprises a half-bridge converter.

3. The ISOP-type partial power converter circuit of claim 2, wherein the half-bridge converter is coupled in series with a clamping capacitor.

4. The ISOP-type partial power converter circuit of claim 1, wherein the regulated DC-to-DC converter comprises a transformer having a primary winding and a secondary winding, the regulated DC-to-DC converter further comprising an inductor coupled to the secondary winding and a full-bridge rectifier coupled to the secondary winding through the inductor and a resonance capacitor.

5. The ISOP-type partial power converter circuit of claim 4, wherein the regulated DC-to-DC converter further comprises:
    a first capacitor coupled to the second output voltage node and the secondary winding of the transformer; and a second capacitor coupled to the secondary winding of the transformer and a ground.

6. The ISOP-type partial power converter circuit of claim 1, wherein the unregulated DC-to-DC converter is referenced to ground by coupling an input to the unregulated DC-to-DC converter to a circuit ground node.

7. The ISOP-type partial power converter circuit of claim 6, wherein the regulated DC-to-DC converter further comprises a half-bridge converter coupled to a primary winding of a transformer and to a second input of the unregulated DC-to-DC converter.

8. The ISOP-type partial power converter circuit of claim 1, wherein the regulated DC-to-DC converter further comprises:
a transformer having a primary winding and a secondary winding, the secondary winding coupled to both a positive output node of the regulated DC-to-DC converter and a flyback output node of the regulated DC-to-DC converter.

9. A partial power converter system comprising:
an isolated, unregulated DC-to-DC converter configured to generate a first output voltage at a first output voltage node, the unregulated DC-to-DC converter comprising a resonant converter operating around a resonant frequency and 0.5 duty cycle; and
a regulated DC-to-DC converter coupled with the unregulated DC-to-DC converter and a power supply node, the regulated DC-to-DC converter being configured to generate a second output voltage at a second output voltage node, the regulated DC-to-DC converter comprising a resonant forward-flyback converter configuration;
wherein the first output voltage node is coupled to a load in parallel with a flyback node of the regulated DC-to-DC converter.

10. The partial power converter system of claim 9, wherein the regulated DC-to-DC converter comprises a half-bridge converter coupled in series with a clamping capacitor.

11. The partial power converter system of claim 9, wherein the regulated DC-to-DC converter comprises:
a transformer having primary and secondary windings; and
a half-bridge converter coupled between the second output voltage node and a ground, the secondary windings of the transformer being coupled to a midpoint of the half-bridge converter.

12. The partial power converter system of claim 11, wherein the regulated DC-to-DC converter further comprises:
a first capacitor coupled to the second output voltage node and the secondary windings of the transformer; and
a second capacitor coupled to the secondary windings of the transformer and a ground.

13. The partial power converter system of claim 9, wherein the unregulated DC-to-DC converter is referenced to ground by coupling an input to the unregulated DC-to-DC converter to a circuit ground node.

14. The partial power converter system of claim 9, wherein the regulated DC-to-DC converter comprises a transformer having a primary winding and a secondary winding, the regulated DC-to-DC converter further comprising an inductor coupled to the secondary winding and a full-bridge rectifier coupled to the secondary winding through the inductor and a resonance capacitor.

15. A method for operation of an Input-Series-Output-Parallel (ISOP)-type power converter circuit, the method comprising:
generating a DC power supply voltage;
generating an unregulated DC voltage from the DC power supply voltage with an isolated, unregulated DC-to-DC converter comprising a resonant converter operating around a resonant frequency and 0.5 duty cycle;
generating a regulated DC voltage from the DC power supply voltage with a regulated DC-to-DC converter coupled in parallel with the unregulated DC-to-DC converter and having a resonant forward-flyback converter configuration; and
coupling the unregulated DC voltage to the regulated DC voltage.

16. The method of claim 15, wherein generating the unregulated DC voltage and the regulated DC voltage comprises applying the DC power supply voltage across an input capacitor, a clamping capacitor, and a series pair of transistors.

17. The method of claim 15, wherein generating the regulated DC voltage comprises:
transmitting an AC voltage over a transformer wherein a secondary AC voltage is 180° out of phase with a primary AC voltage; and
converting the secondary AC voltage to the regulated DC voltage.

18. The method of claim 15, wherein the regulated DC-to-DC converter comprises a half-bridge converter.

19. The method of claim 18, wherein the half-bridge converter is coupled in series with a clamping capacitor.

20. The method of claim 15, wherein the regulated DC-to-DC converter comprises a transformer having a primary winding and a secondary winding, the regulated DC-to-DC converter further comprising an inductor coupled to the secondary winding and a full-bridge rectifier coupled to the secondary winding through the inductor and a resonance capacitor.

* * * * *